United States Patent
Bouzguenda et al.

(10) Patent No.: US 11,761,748 B1
(45) Date of Patent: Sep. 19, 2023

(54) PRECISION SHAFT ALIGNMENT TRAINING METHOD AND DEVICE

(71) Applicant: King Faisal University, Al-Ahsa (SA)

(72) Inventors: Mounir Bouzguenda, Al-Ahsa (SA); Brahim Ben Smida, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/133,825

(22) Filed: Apr. 12, 2023

(51) Int. Cl.
*G01B 5/25* (2006.01)
*F01D 25/28* (2006.01)

(52) U.S. Cl.
CPC ............. *G01B 5/25* (2013.01); *F01D 25/285* (2013.01); *F05D 2230/64* (2013.01)

(58) Field of Classification Search
CPC ...... G01B 5/25; F01D 25/285; F05D 2230/64
See application file for complete search history.

(56) References Cited

U.S. PATENT DOCUMENTS

| | | | |
|---|---|---|---|
| 5,199,182 A | 4/1993 | Fower et al. | |
| 5,621,655 A | 4/1997 | Nower et al. | |
| 8,997,365 B2 * | 4/2015 | Alexander | G01B 5/25 33/645 |
| 9,329,017 B2 * | 5/2016 | Spomer | G01F 1/8413 |
| 9,964,394 B2 * | 5/2018 | Andersson | G01B 5/25 |
| 11,105,202 B2 * | 8/2021 | Ibrahim | F01D 17/02 |
| 11,300,404 B2 * | 4/2022 | Jozokos | G01B 5/25 |
| 2008/0201097 A1 | 8/2008 | Stomberg et al. | |
| 2012/0209408 A1 | 8/2012 | Vietsch | |
| 2013/0111768 A1 | 5/2013 | Lenz | |
| 2013/0326891 A1 * | 12/2013 | Alexander | G01B 5/25 33/645 |
| 2020/0124409 A1 | 4/2020 | Jozokos | |
| 2020/0263546 A1 * | 8/2020 | Ibrahim | F01D 17/02 |
| 2022/0268575 A1 * | 8/2022 | Jozokos | F01D 25/285 |

* cited by examiner

Primary Examiner — Yaritza Guadalupe-McCall
(74) Attorney, Agent, or Firm — Nath, Goldberg & Meyer; Richard C. Litman

(57) ABSTRACT

A system and method for aligning multiple pieces of rotary machinery equipment by coupling rotating shafts extending from at least one of the multiple pieces of rotary machinery equipment. The system includes mounting a first piece of rotary machine equipment to a device comprising two U-shaped plates that are interlocked with each other. The alignment method includes a process for adjusting the first piece of rotary equipment with respect to a first U-shaped plate to correct for either a vertical offset or angular misalignment.

9 Claims, 4 Drawing Sheets

PRECISION SHAFT ALIGNMENT TRAINING METHOD AND DEVICE

BACKGROUND

1. FIELD

The present disclosure relates to a shaft alignment method and device for effecting shaft alignment between separate pieces of rotating equipment.

2. DESCRIPTION OF THE RELATED ART

Rotating machinery, equipment and other devices, can be provided in many form factors, such as an electrical motor, a combustion motor, a pump, a transmission or other gear box, etc. Rotating equipment is commonly configured to couple at least two rotating devices together, referred to as a machine train. The configuration can couple two or more devices together, such as pumps, motors, and the like to provide serial addition of power or parallel functionality, respectively. Alternatively, the configuration can couple two or more dissimilar devices together, such as coupling a motor and a transmission, coupling a motor and a pump, and the like to provide joint functionality. In any configuration, alignment between two adjacent components impacts the reliability and operation of the equipment.

Shaft misalignment is a root cause of more than 50% of rotating equipment operational faults and undesired downtime. Current methods and devices focus upon fault measuring and post measurement adjustment with inaccurate methods and devices for the same.

Many factors can impact alignment between equipment pieces. Alignment of the equipment dictates that the equipment remains stationary and thus the alignment process is completed when the equipment is in a non-operational state. Additionally, the alignment process is normally completed in an ambient environment. Unfortunately, this removes a number of variables which impact the alignment during operation, where those variables are only present during operation. Those variables can include thermal effects on the equipment pieces, balance of rotational elements, changes in compressive components such as soft feet, changes due to torsional effects, and the like. Further, the operational environment commonly changes in temperature, which can affect the mounting area, the equipment, and the like. In most operational scenarios, the equipment and operating environment increases in temperature, impacting the alignment between adjacent temperature. Each individual machine arrangement is unique resulting in differing characteristics. Even identical sets of machinery can dictate different terms for alignment.

Laser alignment was introduced in the 1980's and utilizes one or more diode lasers and detectors (PSD's) The PSDs are able to detect fairly accurate (within 10 μm's) relative positioning between two adjacent shafts. Information is provided to a service person through a display unit. The system determines what information needs to be conveyed to the service person in order to direct the service person on what is required to optimize alignment between two components. The display unit can be provided in any of many known forms, including a computer, preferably comprising a wireless interface. Software converts the detector signals into a set of instructions in an understandable format for the operator or service person where the alignment or component registration is commonly defined by two factors: angular misalignment and parallel/offset misalignment. Another factor that should be considered is end-to-end registration, ensuring that a sufficient gap is provided for thermal expansion, vibrations, and the like. The fundamental setup of the laser alignment method and instrumentation has remained mostly unchanged since its inception and initial application in the 1980's, including a diode laser system with a detector and a portable computer with standard alignment software.

In aligning machinery, it is generally understood by craftspeople that a phenomenon of 'soft foot' can occur. 'Soft Foot' is a common term used for machine frame distortion which is caused when one or more feet of a machine differ in height from the others. This in turn may be due to differences when the machine was manufactured, a squishy footage with oil film, etc. between foot and base, a bent foot, or it may even be induced by a pipe or rod to which the machine is attached, which prevents the machine from touching all of its feet to its base. Such a discrepancy in foot alignment can result in vibration in itself or magnify vibration occurring from some other source.

Accordingly, there remains a need in the art for a method and device for preventing shaft misalignment between pieces of equipment such that the deleterious effects from soft feet are reduced.

SUMMARY

The present subject matter is directed towards a method and device of optimizing alignment between two adjacent rotating machines. The present disclosure is directed towards a precision shaft alignment method and device which optimizes and retains alignment of a series of pieces of rotating equipment coupled together for cooperative operation. More specifically, the present subject matter is directed to the observation, recordation, and utilization of various characteristics of a series of pieces of rotating equipment to optimize and retain alignment therebetween.

Alignment of the rotating machinery according to the present subject matter can be accomplished while the machinery is in an operational state. The alignment process considers any relation between the adjacent pieces of rotating machines. The term machine can refer to any device comprising a rotating mechanism, and should be synonymous with machine, equipment, device, apparatus, and the like.

In one embodiment, the present subject matter relates to a method of optimizing alignment between two adjacent rotating machines comprising: obtaining initial alignment data respective to alignment between a pair of adjacently located rotating machines; monitoring, collecting, recording, and storing equipment condition data during an operation of each adjacently located rotating machine; analyzing the recorded equipment condition data to determine optimal alignment characteristics of the adjacently located rotating machines during an operational condition; mounting each rotating machine of the pair of adjacently located rotating machines to separate devices as described herein; and aligning the adjacently located rotating machines using the optimal alignment characteristics.

In another embodiment, the present subject matter is directed to a device which, when implemented with the method, performs the function of optimizing the alignment between the two adjacent rotating machines.

In this regard, the present subject matter includes a device for rotating machinery alignment, comprising: an inner U-shaped metal plate with four vertical slot-like openings; an outer U-shaped metal plate with four vertical slot-like openings; wherein the inner U-shaped metal plate is situated along an interior surface of the outer U-shaped metal plate such that each one of said four vertical slot-like openings of said inner U-shaped metal plate partially overlaps with a corresponding each one of said four vertical slot-like openings of said outer U-shaped metal plate, wherein a first bolt and nut arrangement comprising four first bolt and nut pairs locks in place said inner U-shaped metal plate to said outer U-shaped metal plate at a portion where said each one of said four vertical slot-like openings of said inner U-shaped metal plate partially overlaps with the corresponding each one of said four vertical slot-like openings of said outer U-shaped metal plate, and wherein a first piece of rotating machinery equipment is mounted to a top side of a large flat portion of said inner U-shaped metal plate by means of four holes in said large flat portion of said inner U-shaped metal plate, each of said four holes receiving a second bolt and nut arrangement comprising four second bolt and nut pairs to secure the first piece of rotating machinery equipment in place on the top side of the large flat portion of said inner U-shaped metal plate.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF EMBODIMENTS

Figure 1:
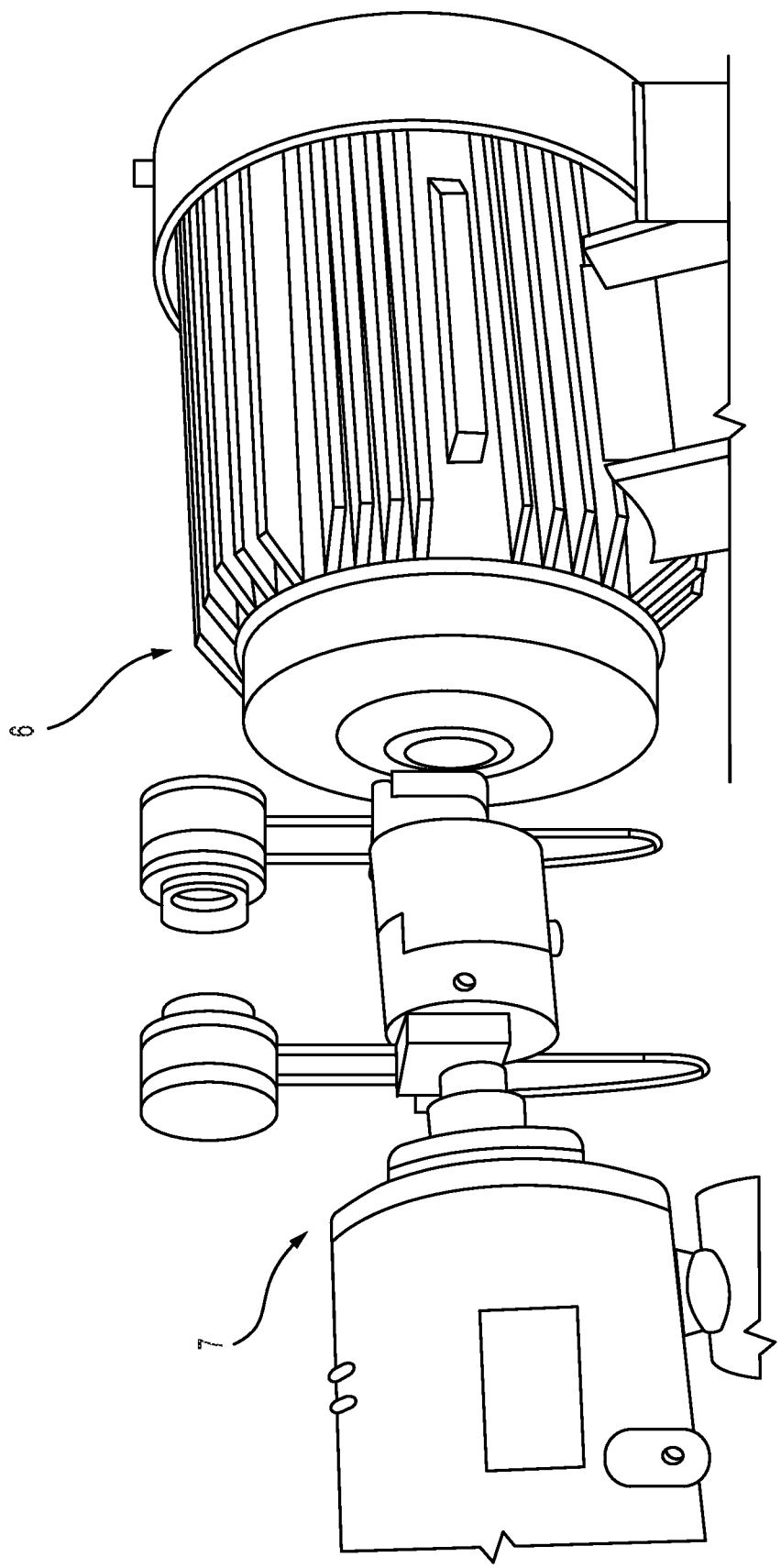
FIG. 1 is a diagram of two adjacently located rotating machines which are misaligned.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where devices are described as having, including, or comprising specific components, or where processes are described as having, including, or comprising specific process steps, it is contemplated that devices of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a device or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The following detailed description is merely exemplary in nature and is not intended to limit the described embodiments or the application and uses of the described embodiments. Any implementation described herein with the words "exemplary" or "illustrative" is not necessarily construed as preferred or advantageous over other implementations. All of the implementations described below are exemplary implementations provided to enable persons skilled in the art to make or use the embodiments of the disclosure and are not intended to limit the scope of the disclosure, which is defined by the claims. For the purposes of the description herein, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the concepts defined in the appended claims. Hence, specific dimensions and other physical characteristics relating to the embodiments disclosed therein are not to be considered as limiting, unless the claims expressly state otherwise.

Rotating machinery commonly involves coupling adjacent machines together for operation as is shown in FIG. 1. Misalignment between adjacent rotating machines can impact the configuration in a variety of ways, including premature failure as in the following examples: 1) Increased frequency of parts replacement, such as bearings, couplings, seals, and the like, which result in additional operational costs including replacement parts and labor; 2) Increased logistics costs, including materials procurement, inventory holding costs, materials management costs, and the like; 3) Increased frequency of interventions, including man hours, materials, tools, transportation, and the like, and thus adding associated intervention costs to the overall operating budgets; and 4) where applicable, impacts from resultant downtime of the machinery, including reduction in productivity, reduced labor efficiencies (revenue per labor cost), reduced real estate efficiency (revenue per area of real estate), lost revenue and the like.

Alignment of the machinery can be done while the machinery is in an operational or non-operational state. The alignment process considers any relation between adjacent pieces of rotating equipment or rotating machines. The term machine can refer to any device comprising a rotating mechanism, and should be synonymous with machine, equipment, device, apparatus, and the like.

Figure 2:
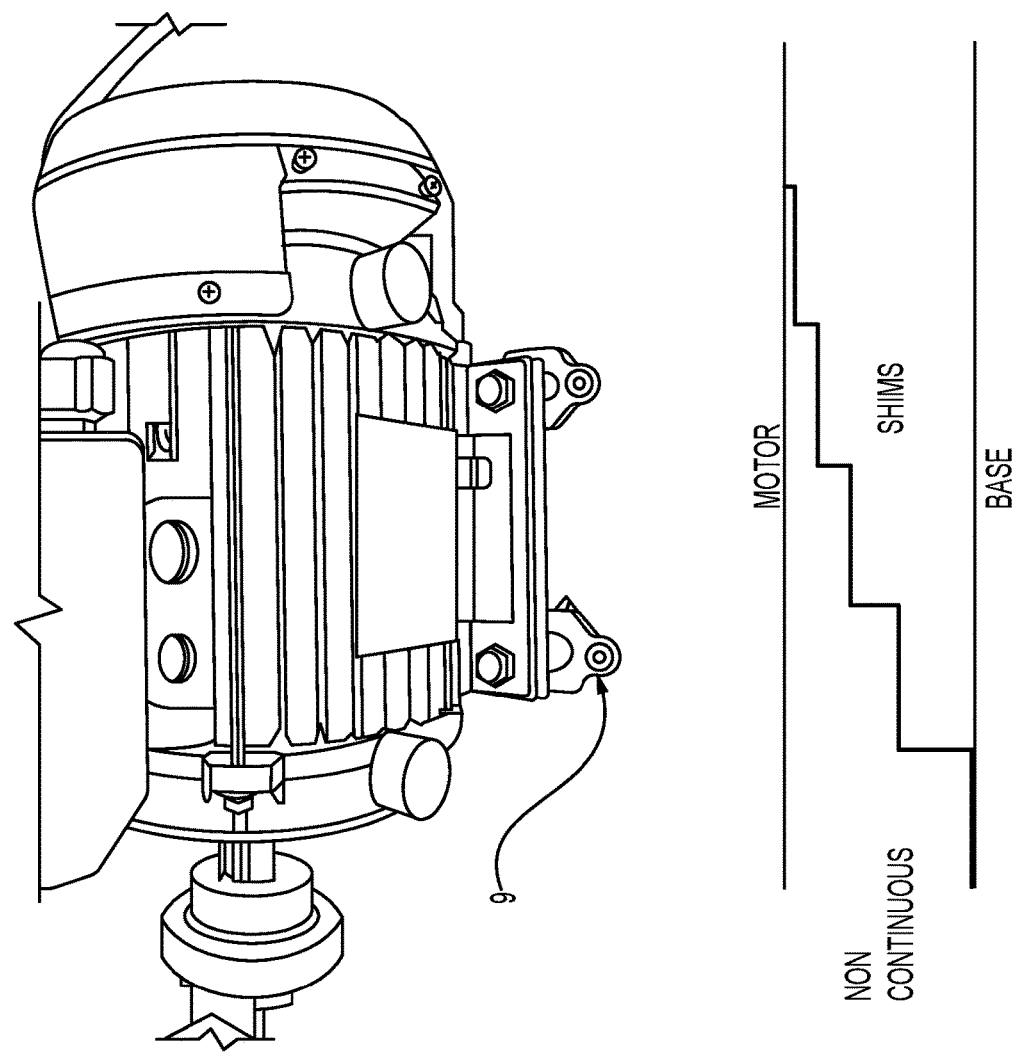
FIG. 2 is a view of the prior art correcting method using shims.

Prior art methods such as the one shown in FIG. 2 rely upon the strategic placement of shims (9) under one or more feet of the rotating equipment to ensure that the desired alignment is achieved. However, the use of one or more shims (9) under one or more feet of the rotating equipment for achieving the desired alignment is not optimal as relying on a stacked arrangement of shims can only be implemented for gaps having a limited thickness. Additionally, the use of shims is not a streamlined process but one where multiple measurements and adjustments in shim positioning must be performed in order to arrive at a desired positioning that eliminates the extant problem of rotating equipment misalignment. And lastly, reliance upon shims for solving misalignment has a further drawback in that the shims can degrade over time due to stress and pressure generated by the rotating equipment's bulk and weight. Accordingly, the shims would have to be periodically replaced as they break down over time.

In contrast, as shown in FIG. 1, in an exemplary embodiment of the present subject matter, a mounted first rotating motor (6) is located adjacent to a mounted second rotating pump (7). The exemplary first and second mounted machines of FIG. 1 are a motor and a pump, respectively, but the present methods and device could further be applied to any other sets of rotating machinery, including by way of non-limiting example electrically operated motors, combustion motors, transmissions, turbines, and the like.

Figure 4:
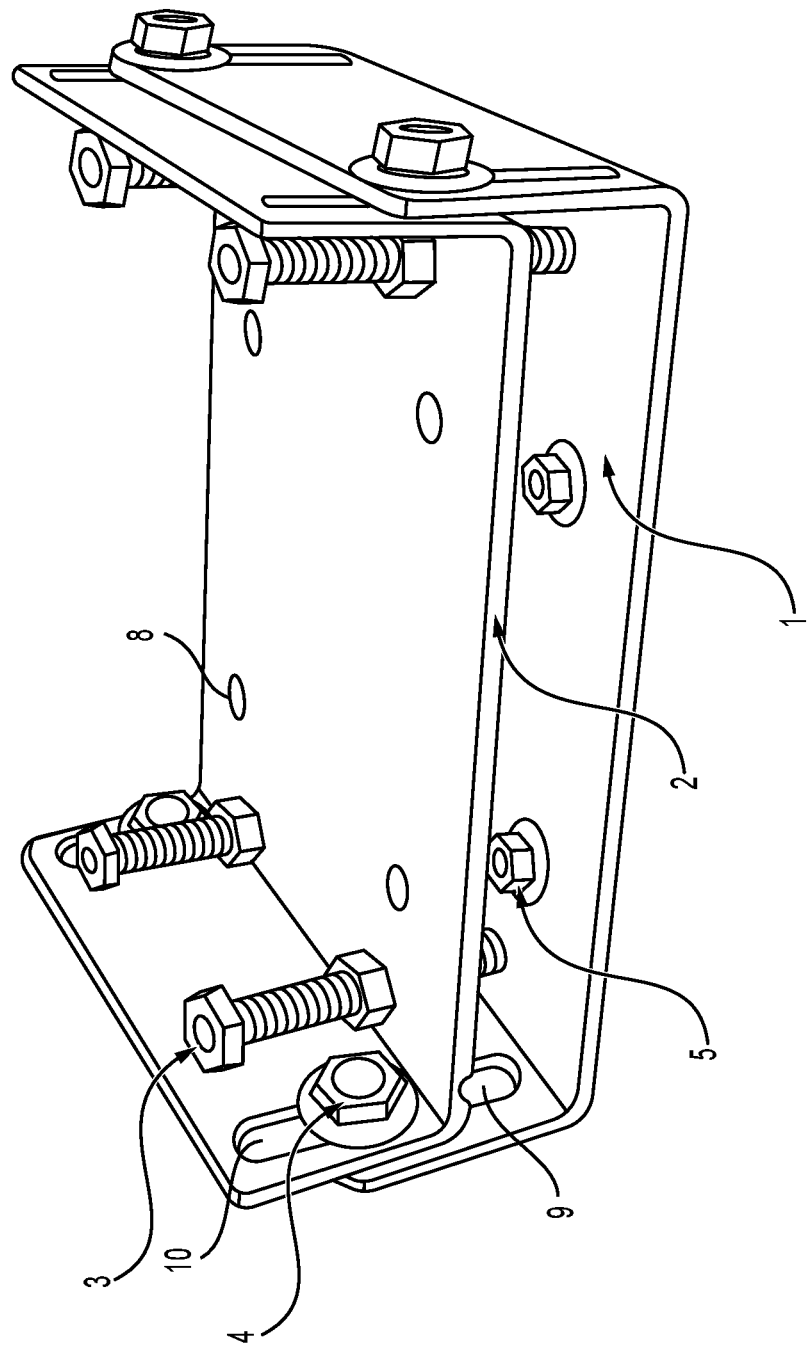
FIG. 4 is a view of the device formed from two interlocking U-shaped plates

As shown in FIG. 4, the proposed device is made of two metal sheets each having a U-shape, where a first inner U-shaped metal sheet (2) interlocks with a second outer U-shaped metal sheet (1) in a vertically and slidably engaging fashion using a quartet of first nuts and bolts (4). In particular, each of the first inner (2) and second outer (1) U-shaped metal sheets have four vertical slot-like openings (10, 9) through which one pair of each of the first nuts and bolts are engaged.

In certain embodiments, the inner U-shaped metal plate (2) is situated along an interior surface of the outer U-shaped metal plate (1) such that each one of said four vertical slot-like openings (10) of said inner U-shaped metal plate (2) partially overlaps with a corresponding each one of said four vertical slot-like openings (9) of said outer U-shaped metal plate (1). In this regard, a first bolt and nut arrangement comprising four first bolt and nut pairs (4) locks in place said inner U-shaped metal plate (2) to said outer U-shaped metal plate (1) at a portion where said each one of said four vertical slot-like openings (10) of said inner U-shaped metal plate (2) partially overlaps with the corresponding each one of said four vertical slot-like openings (9) of said outer U-shaped metal plate (1).

In another embodiment, a first piece of rotating machinery equipment can be mounted to a top side of a large flat portion of said inner U-shaped metal plate (2) by means of four holes (8) in said large flat portion of said inner U-shaped metal plate (2), each of said four holes (8) receiving a second bolt and nut arrangement comprising four second bolt and nut pairs (11) to secure the first piece of rotating machinery equipment in place on the top side of the large flat portion of said inner U-shaped metal plate (2).

Figure 3:
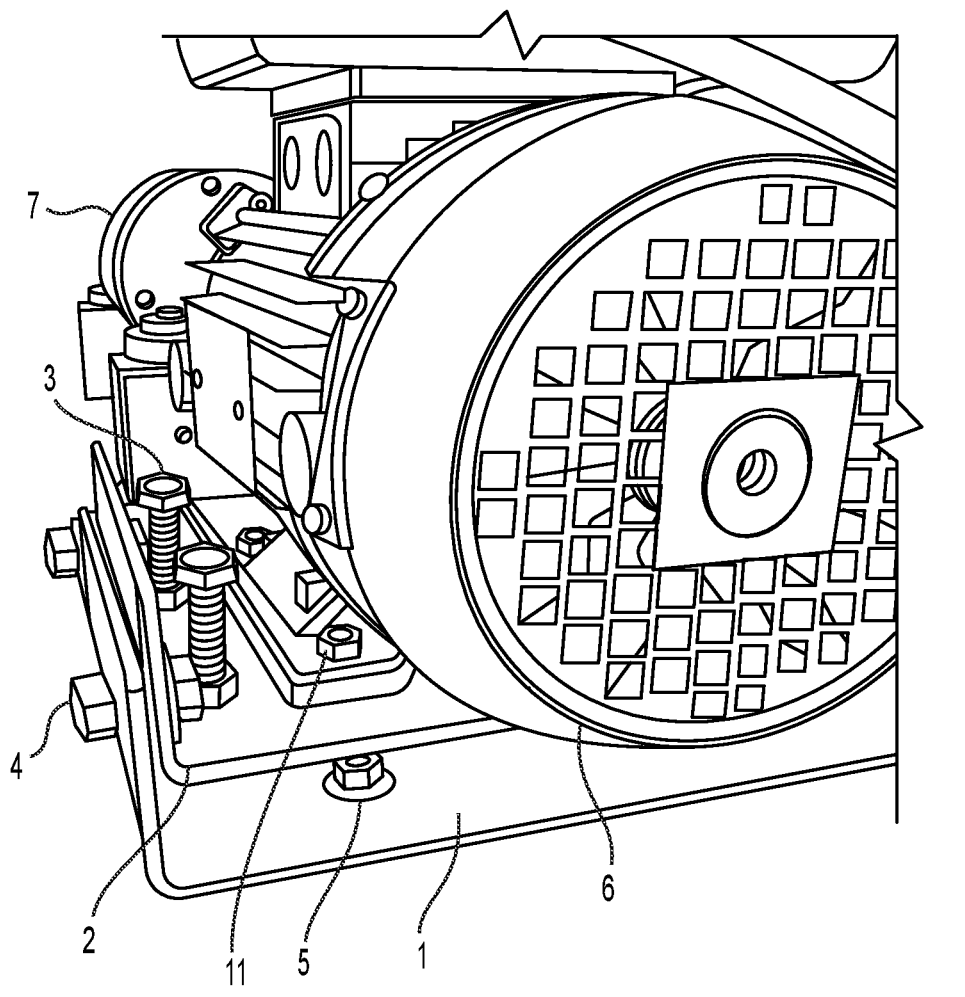
FIG. 3 is a view of the correction method using the present device.
Figure 3:
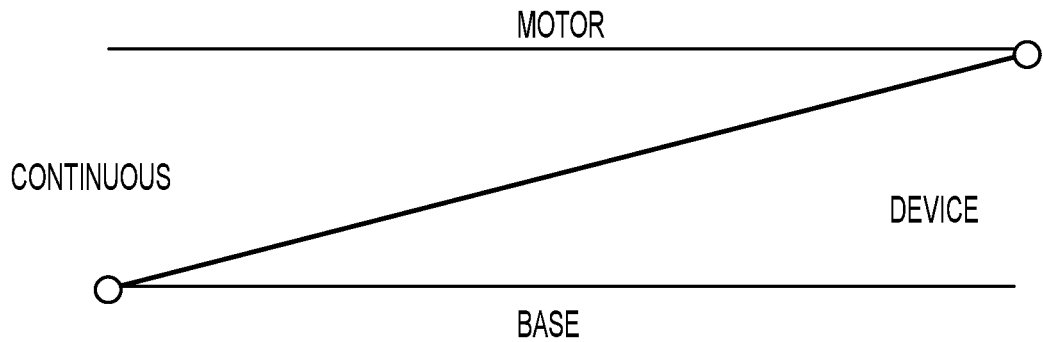

In another embodiment, said outer U-shaped metal plate (1) has an additional quartet of holes in a bottom surface of said outer U-shaped metal plate for mounting the bottom surface of said outer U-shaped metal plate to a fixed surface for stability. The second outer U-shaped metal plate (1) can be mounted by a bottom surface of its base to a fixed surface for stability using a third nut and bolt arrangement comprising four third bolt and nut pairs (5) going through an additional quartet of holes in the bottom surface of the outer U-shaped metal plate (1). The slidable engagement between the two U-shaped metal sheets is achieved by the alignment of a respective quartet of outer U-shaped metal sheet vertical slots (9) with a respective quartet of inner U-shaped metal sheet vertical slots (10) where each slot is positioned fixedly with its respective counterpart by means of a tightened nut and bolt combination (4). The first piece of rotating machinery equipment such as, by way of non-limiting example, a first rotating motor (6), is attached to the inner U-shaped metal sheet (2) using four holes (8) with four nut and bolt combinations (11) in a manner as shown in FIG. 3.

In another embodiment, the inner U-shaped metal plate (2) can have a second quartet of holes and a bolt and dual nut arrangement comprising four sets of one bolt and two nuts each (3), wherein each hole in said second quartet of holes receives one of said sets of one bolt and two nuts (3). In this regard, the first piece of rotating machinery equipment (6) is positioned to have proper alignment with the second piece of rotating machinery equipment (7) by simultaneously manipulating all four sets of one bolt and two nuts (3) to properly align a shaft of said first piece of rotating machinery equipment (6) with said second piece of rotating machinery equipment (7) to correct for a misalignment due to a vertical offset, or for a misalignment due to angularity.

In this regard, the device is used to correct the vertical offset and the angularity with the laser shaft alignment method discussed above. In the non-limiting example shown in the present figures, the intent is to align the motor (6) with the driven equipment such as the pump (7). The motor is bolted to the upper part of the device at the inner U-shaped metal sheet (2) using four nut/bolt combinations (11) at four holes (8) as shown in FIGS. 3-4. In order to meet the goal of aligning the motor (6) with the driven equipment (7), one can adjust the vertical offset by adjusting the quartet of screws (3) simultaneously with the same action. For angularity or soft foot correction, the quartet of screws are actuated individually depending on the particular degree of angularity desired. The adjustment process is verified and authenticated using the already discussed laser shaft alignment method. When the desired angularity and vertical offset is reached, the bolts are tightened to preserve the desired orientation and position of the motor with respect to the pump.

It is to be understood that rotating machinery alignment method and device is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A device for rotating machinery alignment, comprising:
    an inner U-shaped metal plate with four vertical slot-like openings;
    an outer U-shaped metal plate with four vertical slot-like openings;
    wherein the inner U-shaped metal plate is situated along an interior surface of the outer U-shaped metal plate such that each one of said four vertical slot-like openings of said inner U-shaped metal plate partially overlaps with a corresponding each one of said four vertical slot-like openings of said outer U-shaped metal plate;
    wherein a first bolt and nut arrangement comprising four first bolt and nut pairs locks in place said inner U-shaped metal plate to said outer U-shaped metal plate at a portion where said each one of said four vertical slot-like openings of said inner U-shaped metal plate partially overlaps with the corresponding each one of said four vertical slot-like openings of said outer U-shaped metal plate; and
    wherein a first piece of rotating machinery equipment is mounted to a top side of a large flat portion of said inner U-shaped metal plate by means of four holes in said large flat portion of said inner U-shaped metal plate, each of said four holes receiving a second bolt and nut arrangement comprising four second bolt and nut pairs to secure the first piece of rotating machinery equipment in place on the top side of the large flat portion of said inner U-shaped metal plate.

2. The device for rotating machinery alignment as recited in claim 1, wherein said outer U-shaped metal plate has an additional quartet of holes in a bottom surface of said outer U-shaped metal plate for mounting the bottom surface of said outer U-shaped metal plate to a fixed surface for stability.

3. The device for rotating machinery alignment as recited in claim 2, further comprising a third bolt and nut arrangement comprising four third bolt and nut pairs, wherein each hole in said additional quartet of holes receives one of said four third bolt and nut pairs.

4. The device for rotating machinery alignment as recited in claim 2, wherein the inner U-shaped metal plate has a second quartet of holes and a bolt and dual nut arrangement comprising four sets of one bolt and two nuts each, wherein which each hole in said second quartet of holes receives one of said sets of one bolt and two nuts.

5. The device for rotating machinery alignment as recited in claim 4, wherein the first piece of rotating machinery equipment is positioned to have proper alignment with the second piece of rotating machinery equipment by simultaneously manipulating all four sets of one bolt and two nuts to properly align a shaft of said first piece of rotating machinery equipment with said second piece of rotating machinery equipment to correct for a misalignment due to a vertical offset.

6. The device for rotating machinery alignment as recited in claim 4, wherein the first piece of rotating machinery equipment is positioned to have proper alignment with the second piece of rotating machinery equipment by manipulating a single set of one bolt and two nuts to properly align a shaft of said first piece of rotating machinery equipment with the second piece of rotating equipment to correct for a misalignment due to angularity.

7. The device for rotating machinery alignment as recited in claim 1, wherein the first piece of rotating machinery equipment is a rotating motor.

8. The device for rotating machinery alignment as recited in claim 7, wherein the second piece of rotating machinery equipment is a rotating pump.

9. A method of optimizing alignment between two adjacent rotating machines comprising:
    obtaining initial alignment data respective to alignment between a pair of adjacently located rotating machines;
    monitoring, collecting, recording, and storing equipment condition data during an operation of each adjacently located rotating machine;
    analyzing the recorded equipment condition data to determine optimal alignment characteristics of the adjacently located rotating machines during an operational condition;
    mounting each rotating machine of the pair of adjacently located rotating machines to separate devices of claim 1; and
    aligning the adjacently located rotating machines using the optimal alignment characteristics.

* * * * *

UNITED STATES PATENT AND TRADEMARK OFFICE
CERTIFICATE OF CORRECTION

PATENT NO. : 11,761,748 B1
APPLICATION NO. : 18/133825
DATED : September 19, 2023
INVENTOR(S) : Mounir Bouzguenda and Brahim Ben Smida It is certified that error appears in the above-identified patent and that said Letters Patent is hereby corrected as shown below:

In the Claims

Please amend Claim 5, Column 8, Lines 17-18, to read "...to have proper alignment with a second piece of rotating machinery equipment..."

Please amend Claim 6, Column 8, Lines 24-25, to read "... as recited in claim 5...."

Please amend Claim 8, Column 8, Lines 35-37, to read "8. The device for rotating machinery alignment as recited in claim 5, wherein the first piece of rotating machinery equipment is a rotating motor and the second piece of rotating machinery equipment is a rotating pump."

Signed and Sealed this
Sixteenth Day of July, 2024

Katherine Kelly Vidal
*Director of the United States Patent and Trademark Office*